United States Patent [19]

French

[11] 4,342,911
[45] Aug. 3, 1982

[54] FOCUSED NUCLEAR INTERFACE SURVEY INSTRUMENT AND METHOD OF DETERMINING DENSITY CHANGES IN MINING AND STORAGE WELLS

[76] Inventor: Lewis L. French, 11250 Concho La., Houston, Tex. 77072

[21] Appl. No.: 107,782

[22] Filed: Dec. 28, 1979

[51] Int. Cl.³ ............................................. G01V 5/00
[52] U.S. Cl. .................................. 250/258; 250/257; 250/268; 250/269
[58] Field of Search ............... 250/253, 257, 258, 269, 250/268

[56] References Cited

U.S. PATENT DOCUMENTS

| | | |
|---|---|---|
| 2,942,111 | 6/1960 | Worthington . |
| 2,961,544 | 11/1960 | Youmans et al. .................... 250/269 |
| 2,972,679 | 2/1961 | Caldwell et al. . |
| 3,223,968 | 12/1965 | De Shazo, Jr. . |
| 3,263,082 | 7/1966 | Caldwell . |
| 3,284,630 | 11/1966 | Clark ................................ 250/258 |
| 3,840,746 | 10/1974 | Kehler ................................ 250/360 |
| 3,846,631 | 11/1974 | Kehler ................................ 250/269 |
| 3,932,747 | 1/1976 | Sherman ............................ 250/256 |
| 3,976,879 | 8/1976 | Turcotte ............................ 250/266 |
| 4,034,218 | 7/1977 | Turcotte ............................ 250/269 |

OTHER PUBLICATIONS

1978 Gearhart-Owen Catalog, Gearhart-Owen Industries, Inc., Fort Worth, Texas.

*Primary Examiner*—Davis L. Willis
*Attorney, Agent, or Firm*—David A. Rose; Ned L. Conley; Murray Robinson

[57] ABSTRACT

The instrument and method locate anomalies and the interface between two materials having little difference in their density in a mining or storage well. More particularly, the method comprehends the generation of gamma rays and the detection of scattered rays at a point spaced from the point of generation of the gamma rays. By moving the points of generation and detection through the well, there will be observed a pronounced change in the detection rate of the scattered gamma rays when various interfaces and anomalies are traversed.

The focus interface instrument includes a decentralizer, collar locator, electronics assembly, detector, and radiation generator, all enclosed in a nonmagnetic stainless steel housing except for the electronics assembly whose housing is made of tubular steel. The radiation generator has a radioactive source which emits gamma rays, and the detector detects those rays reflected back to the detector. The detected rays are counted by electronic equipment at the surface and recorded on a log. The radioactive source is shielded within the tool by heavy metal (density greater than lead) to focus and concentrate the gamma rays through restricted vertical and horizontal angles of radiation. The tool provides for the collimation of the original and the scattered gamma ray beams for better definition of the density changes.

In operation the instrument is lowered to the bottom of the well on a cable having an electronic connection between the tool and the electronic equipment at the surface. The decentralizer locates the tool against the inner wall of the tubing and the radioactive source emits gamma rays through the tubing, any casing strings and into the well. The gamma rays impinge upon the molecules of the materials around the radioactive source and the number of rays reflected back to the detector are counted by the electronic equipment at the surface. The density changes of the various materials and anomalies around the tubing are determined by the change in the gamma ray count as the total is traversed through the tubing.

20 Claims, 18 Drawing Figures

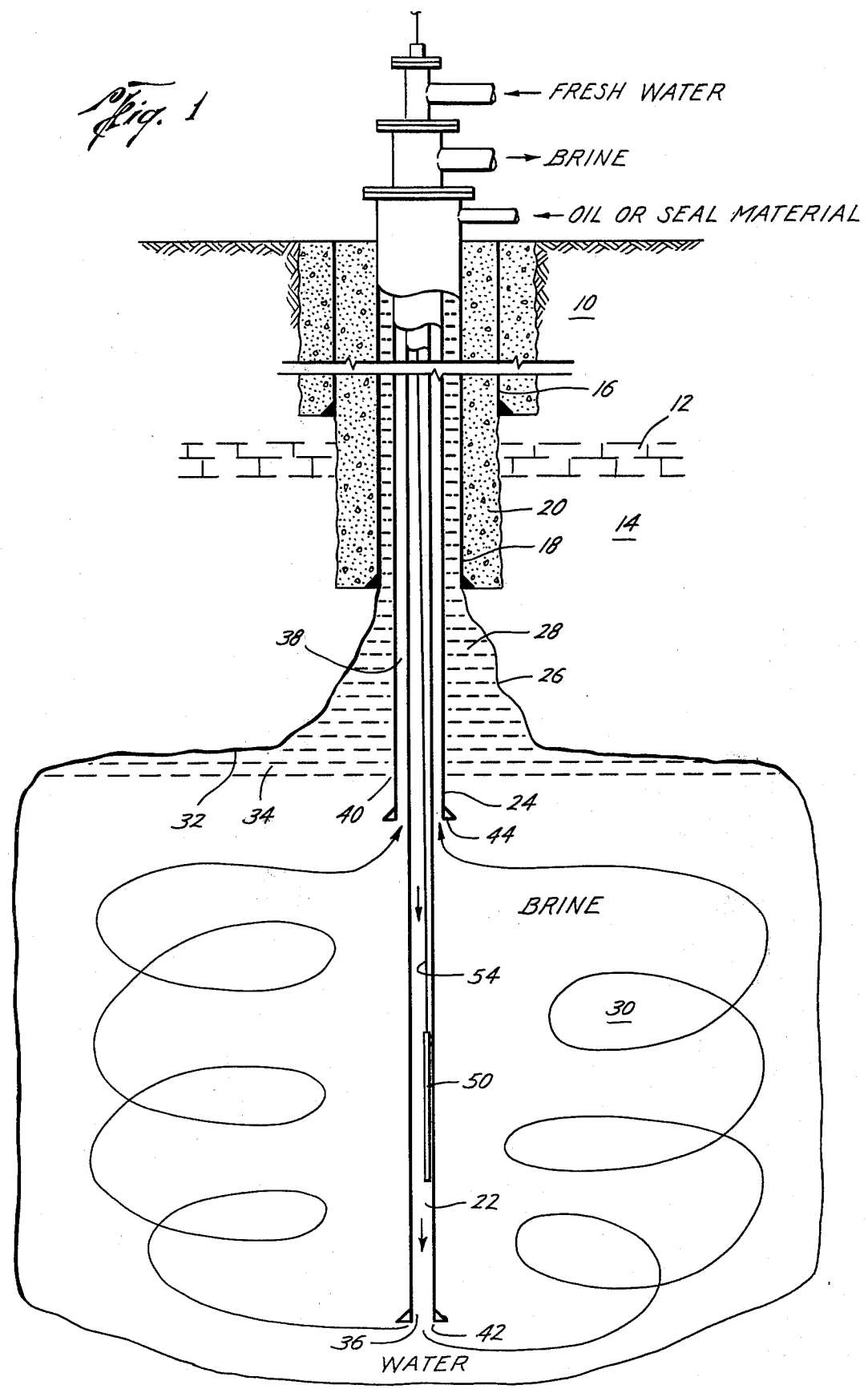

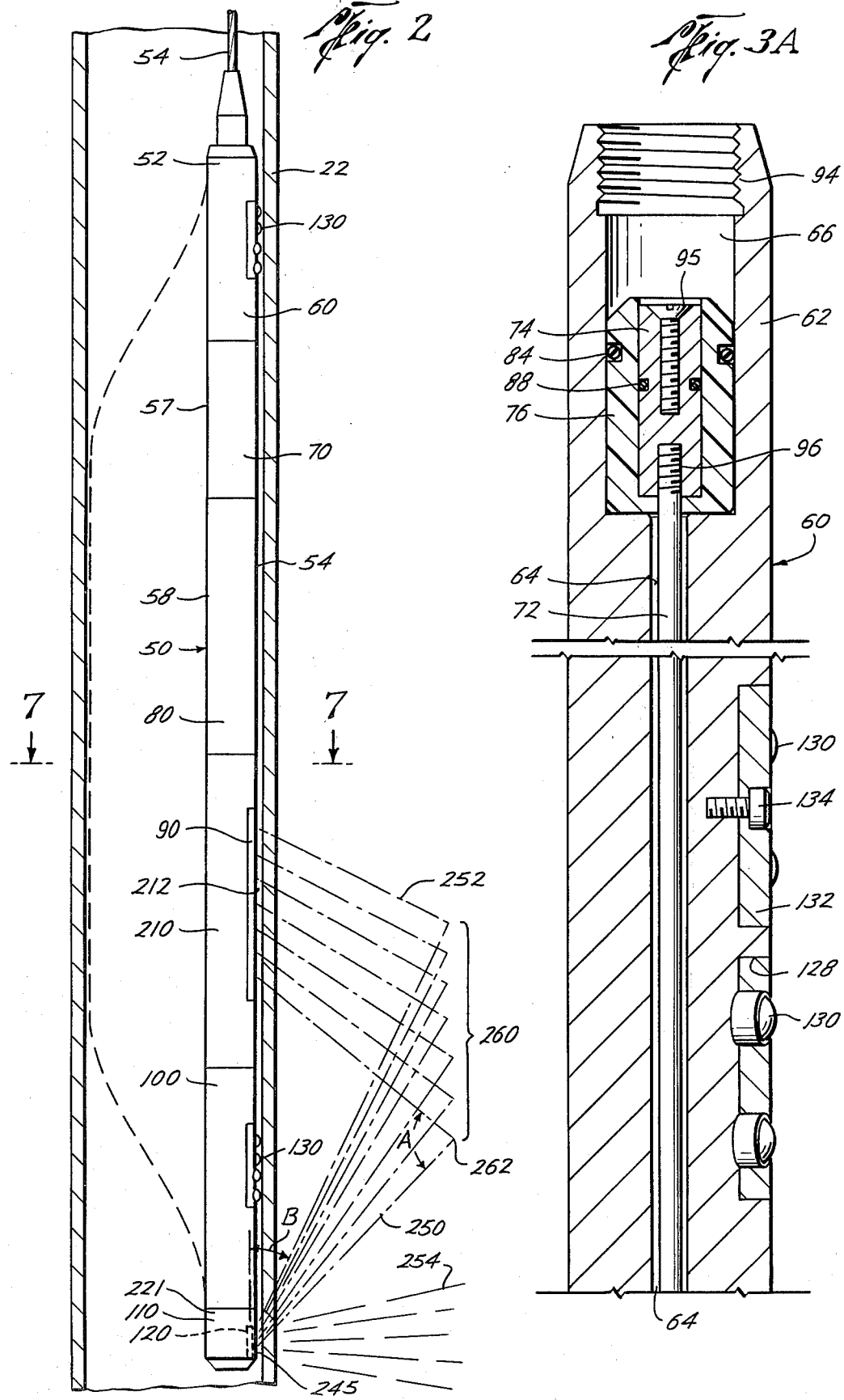

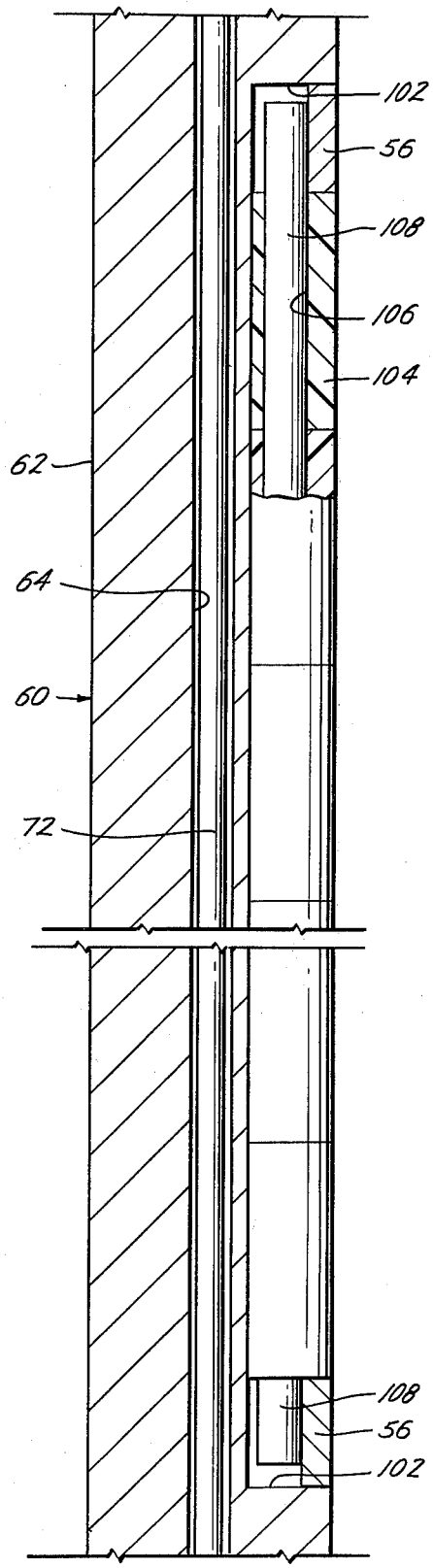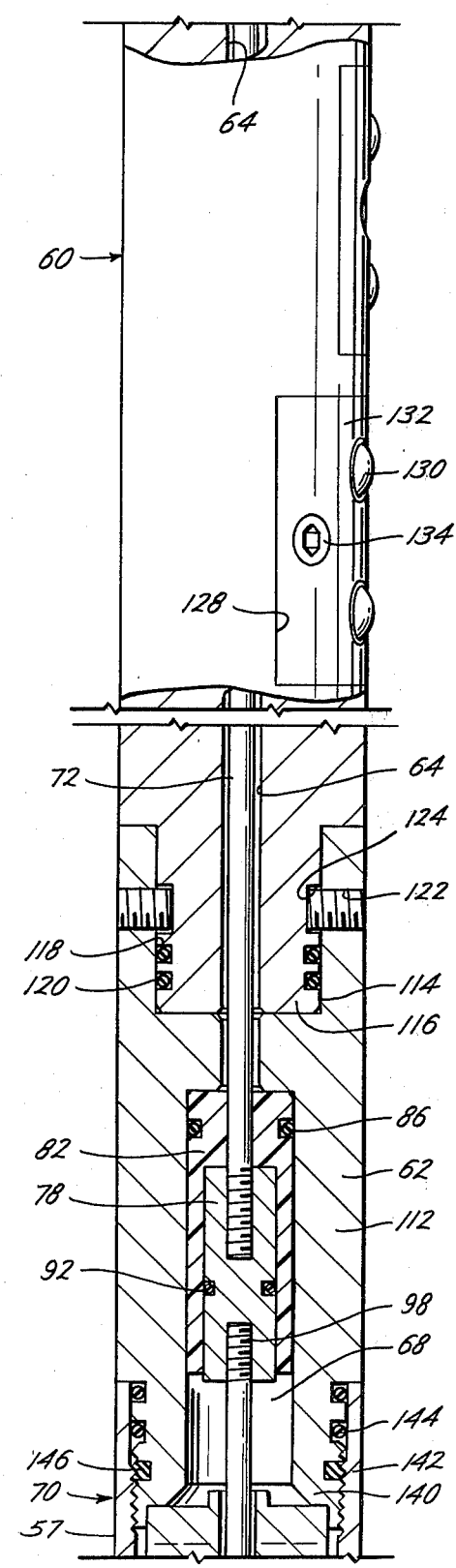

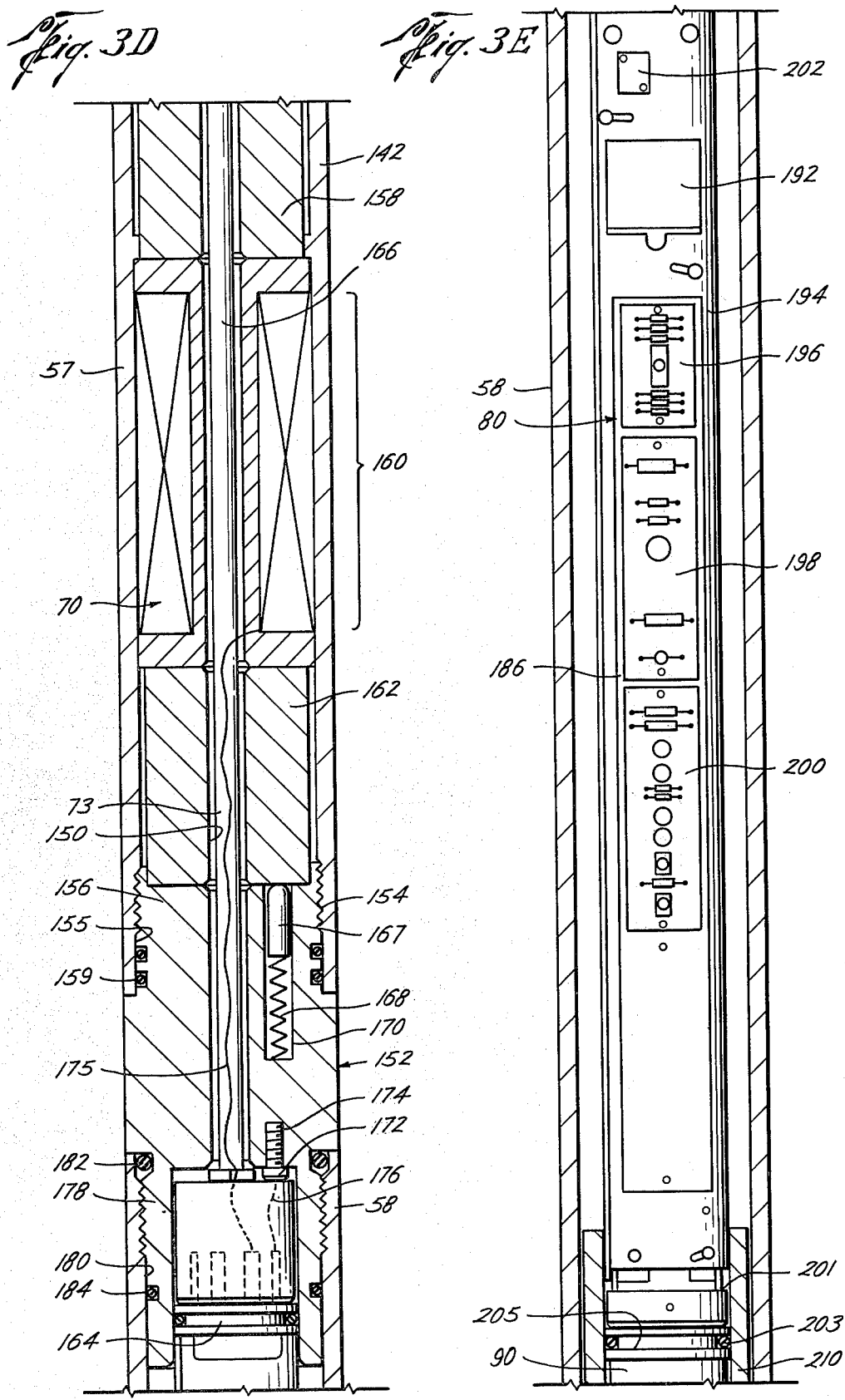

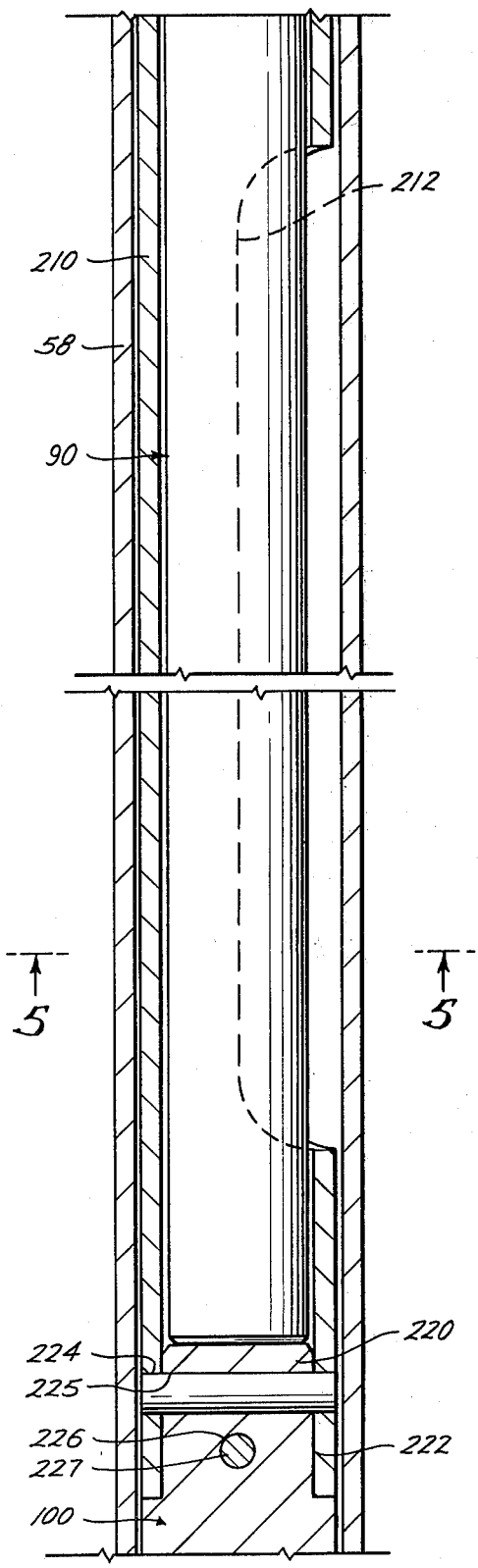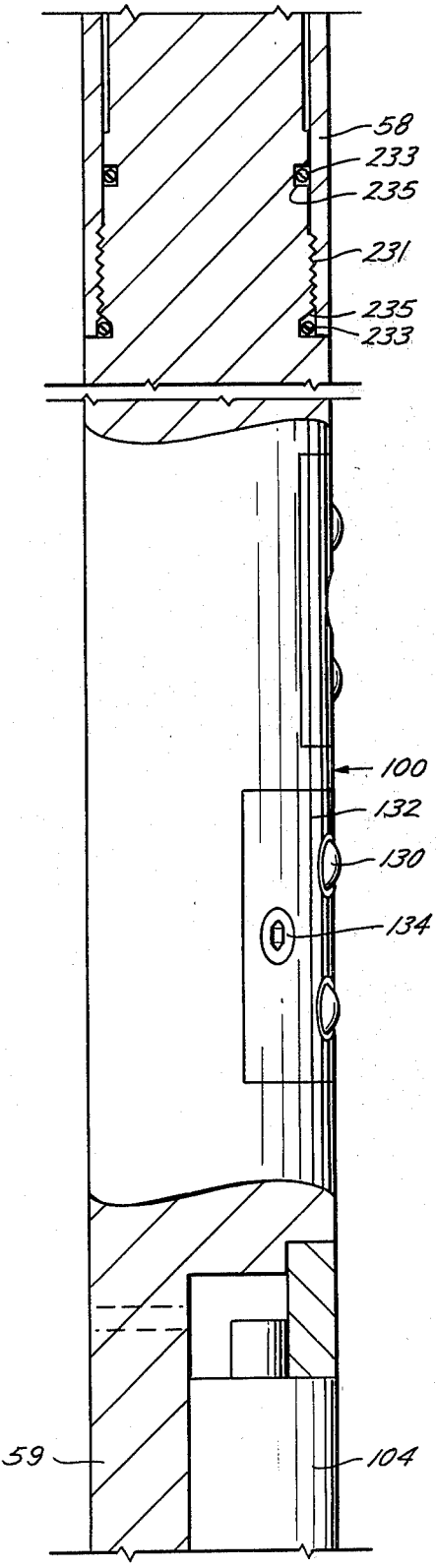

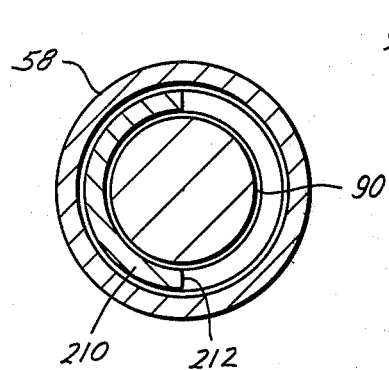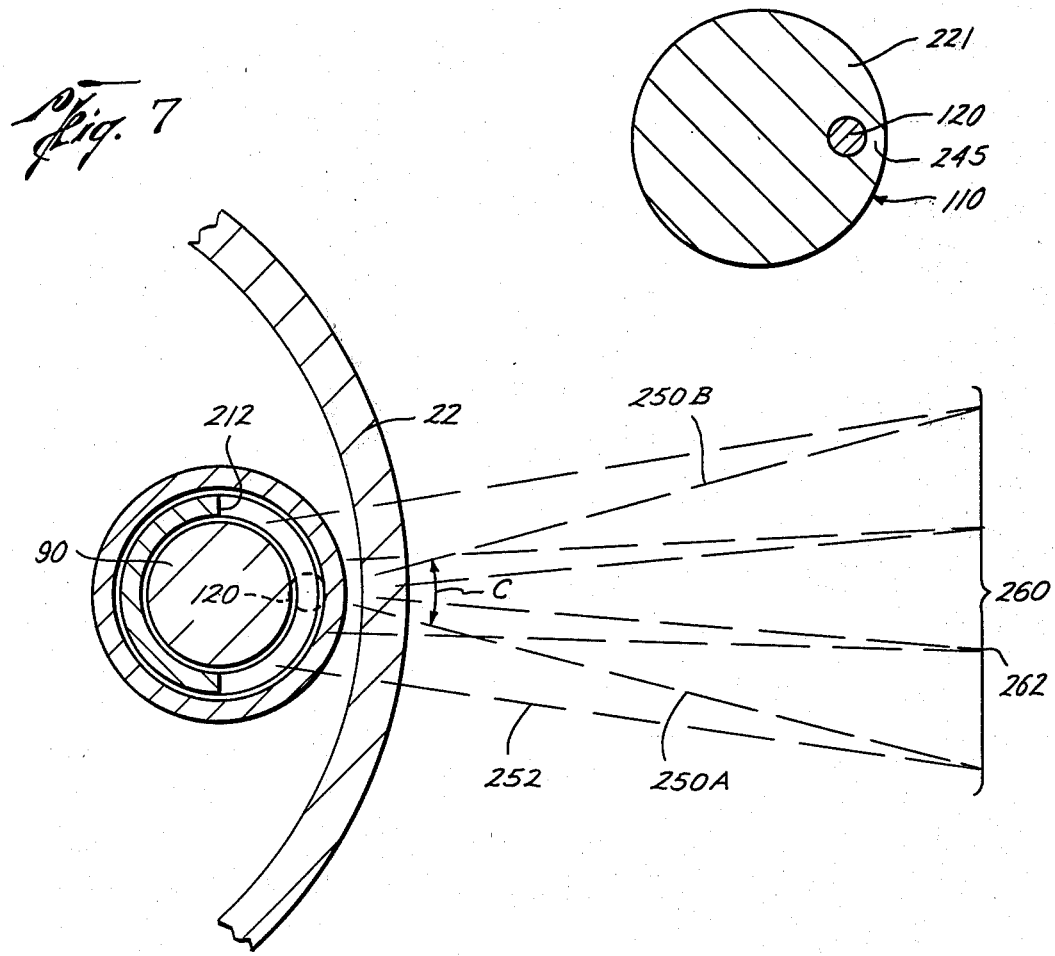

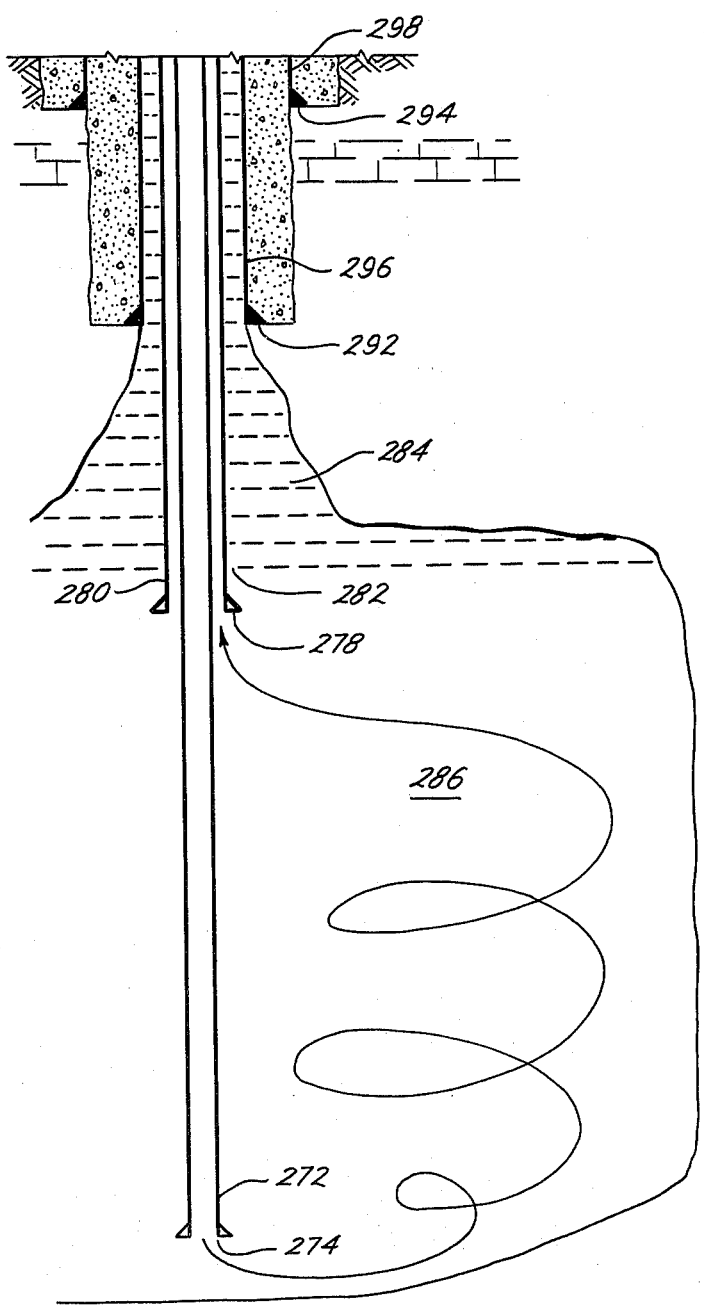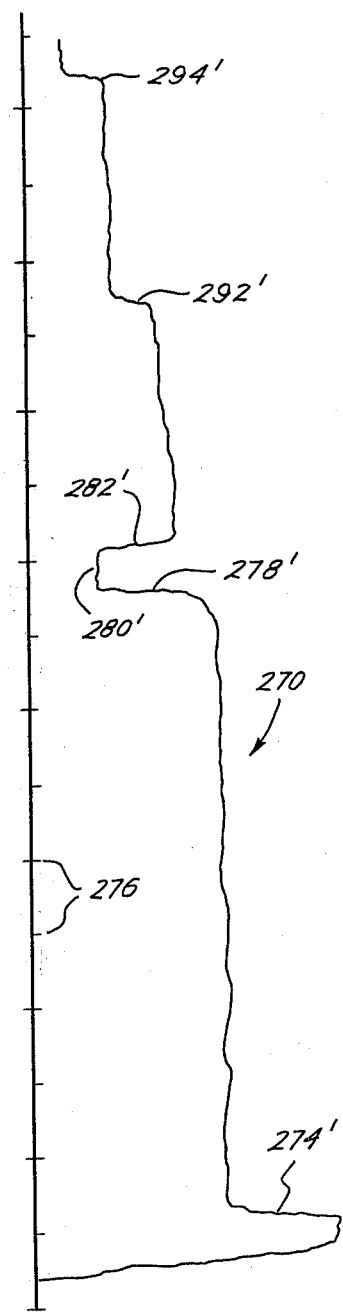

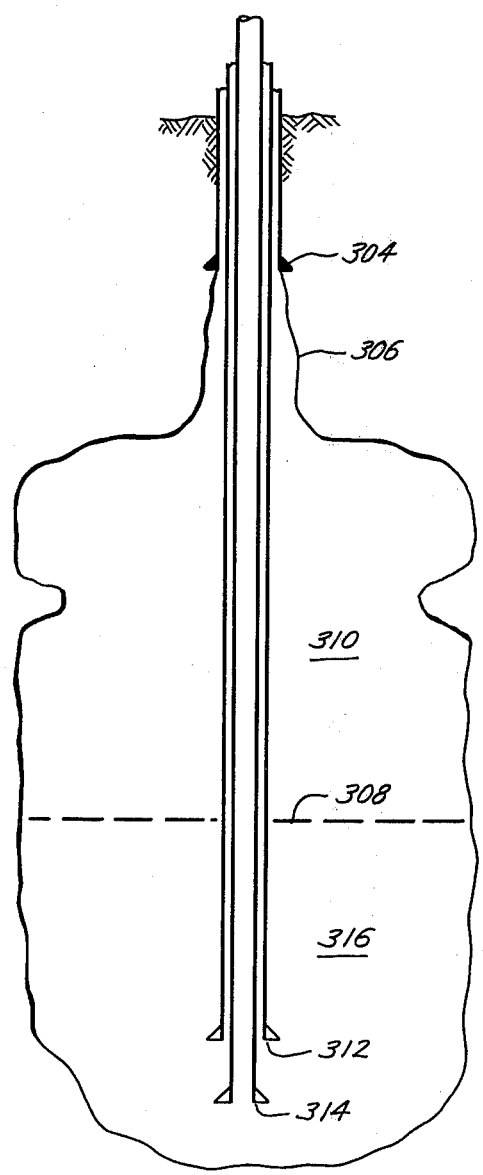
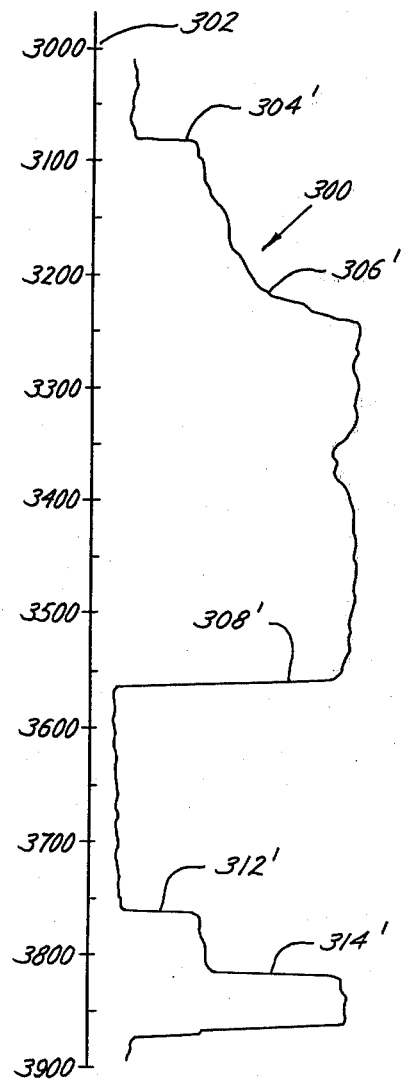

FOCUSED NUCLEAR INTERFACE SURVEY INSTRUMENT AND METHOD OF DETERMINING DENSITY CHANGES IN MINING AND STORAGE WELLS

TECHNICAL FIELD

This invention relates to a tool and method for determining density changes in the media and borehole anomalies of mining and storage wells located in salt formations in the earth. The focused nuclear interface survey instrument is particularly intended to be used for diagnostic work in production wells and in wells containing immiscible fluids which have little difference in their densities.

BACKGROUND ART

Radioactivity has long been used to determine the density of materials. The simplest method is the measurement of the attenuation of a beam of photons passing through the material of interest. For example, in the measurement of the density of soil, a source of gamma rays and a detector are lowered into the ground in two different boreholes. In such a case, the intensity registered by the detector is $I = I_o e^{-uL}$ where $I_o$ is the intensity before absorption, L is the distance between the source and the detector, and u the absorption coefficient of the soil. Thus u is a measure of the number of electrons present in a unit volume, and therefore an indication of the density.

Very often, however, the material of interest cannot be placed between the source and the detector. In such a case gamma scattering methods must be used. A collimated source and a detector are placed near the surface of the material and photons are directed from the source toward the material. Some of these photons are backscattered toward the detector and those backscattered photons (Compton scattering) are detected and registered by the detector. Since the number of backscattered photons depends on the electron density of the material, a count thereof is a measure of the density of the material.

Such gamma scattering methods are often necessary to obtain information regarding geological strata penetrated by boreholes in oil exploration and recovery operations. Knowing the densities of the various formations in the borehole is of value in identifying the particular formations. If the rock matrix is known, a knowledge of the formation density enables the determination of the porosity of the formation. Thus, the use of these density logs with other seismograph and gravity meter data will reveal some of the major changes in the lithology.

Gamma well logging methods employing density logging tools have been commonly used to measure the density of formations penetrated by the borehole. Density logging tools utilize a gamma ray source and a gamma ray detector shielded from each other to prevent the detector from counting the radiation that is emitted directly from the radioactive source towards the detector. During operation of the tool, gamma rays (or photons) emitted from the radiation source enter the borehole to be studied, and interact with the atomic electrons of the material around the borehole by photoelectric absorption, Compton scattering, or (if the energy of the gamma radiation is high enough) by pair production. The photoelectric absorption process, as well as the pair production process, remove from the original gamma ray beam those particular photons that are involved in these reactions. In the Compton scattering process the involved photon only loses some of its energy while changing its original direction of travel. The amount of energy lost by the photon is a function of the scattering angle.

Some of the photons emitted from the radioactive source into the sample are scattered towards the detector. Many of these never reach the detector, since their direction is changed by a second Compton scattering, or they are absorbed by the photoelectric absorption process or the pair production process. The scattered photons that reach the detector and interact with it are counted by the electronic equipment associated with the detector.

Generally, density logging tools take advantage of the Compton scattering effect, where gamma radiation is scattered in an interaction with free or loosely bound electrons in the scattering medium. The gamma radiation scattering thus achieved can be measured in that when the energy of the incident gamma radiation is known, the energy of the gamma radiation that is Compton scattered at a particular angle with respect to the incident radiation, can be calculated. Furthermore, the probability that a gamma ray will be scattered from a particular zone or volume of an earth formation is proportional to the number of electrons in the zone. The count rate of detected, singly scattered gamma radiation is, therefore, related to the density of the scattering zone.

Both the scattering in the material around the borehole as well as the absorption of photons from the original and the scattered gamma ray beams are functions of the electron density of the material which, in turn, can be interpreted in terms of the density of the material itself. For short source detector spacings, the scattering process dominates over the absorption process, and the counting rate of the detector increases with increasing density. For long source detector spacings, the absorption process dominates over the scattering process, and the counting rate of the detector decreases with increasing density of the sample.

The usefulness of density logging tools for obtaining indications of earth formation density surrounding a borehole is well known, and the principles on which they operate are, similarly, well known to those skilled in the art. However, the physics of such tools suitable for making a count of backscattered photons are very complicated because the detector registers photons of different energies (due to different scattering angles) and the photons are attenuated during their passage through the material. The attenuation of the photons is also a function of the electron density of the material. The situation becomes even more complicated when the material of interest is not directly accessible, as when other substances, such as a casing or well fluid, are placed between the material and the measuring instrument. In such cases, the measured data cannot be interpreted universally and individual calibration curves must be taken for each condition.

In the logging of formations traversed by a well bore, it has long been recognized that irregularities and the diameter and shape of the well bore affect the physical measurements being made therein. Thus, it is frequently necessary to make a caliper survey of the diameter of the well bore to provide a correct interpretation of the physical measurement along any particular portion of the borehole.

Commonly, radioactive well logging in cased, air or gas filled boreholes requires either special equipment or at a minimum, extensive corrections to the log produced by a tool intended for use under fluid-filled borehole standard conditions. Generally, the magnitude of the correction required increases with the inner diameter of the borehole. The change from a liquid filled into a substantially gas filled borehole, however, is frequently such a significant departure from the design conditions of the tool that correction of the log with exceptional accuracy is usually not possible, regardless of the borehole inner diameter.

Other major difficulties encountered in using conventional density logging tools and methods are the disturbing effects of undesired, interfering materials and noise.

Density logging tools for investigating the bulk density of boreholes in earth formations are not sufficiently sensitive when used to locate the interface of two materials having little difference in their densities. Such is the case, for example, in mining and storage wells in salt formations.

In the mining of a typical well in a salt formation, a borehole is drilled in the salt formation and one or more casing strings are cemented in the borehole. Inner and outer tubing strings are run into the innermost casing with hydrocarbons pumped down the annulus between the outer tubing and inner tubing. Such hydrocarbons form a pad over the roof of the cavern caused by the mining operation. Fresh water is pumped down the inner tubing to form brine and the brine is forced up the annulus formed between the outer and inner tubings. It often becomes necessary to locate the interface between the hydrocarbons and brine and possibly the interface between the brine and water if the operation has been stopped to permit the brine-water interface to form. Such interfaces are difficult to detect using density logging tools.

Large quantities of product are now being stored in salt caverns formed by mining operations. Often a number of storage wells are located in the same salt formation. Such storage wells will be filled with product and brine which create a brine-product interface. A product, such as ethylene dichloride or caustic, has a density very close to brine and therefore it is very difficult to detect the interface. Storage wells for ethylene lichloride or caustic will also have a hydrocarbon pad. Thus when it becomes necessary to determine the level of product in such a storage well, prior art tools have difficulty locating the brine-product interface.

Further, in such mining and storage wells it often is necessary to determine other media and borehole anomalies such as the location of various sized casing and tubing strings, casing collars, etc.

Prior logging tools are not sufficiently sensitive for such applications. The present invention overcomes the deficiencies of such prior logging tools by providing a substantially improved instrument and method. The improved instrument and method provide a more sensitive reading, thereby greatly enhancing detection. Other objects and advantages of the invention will appear from the following description.

DISCLOSURE OF INVENTION

In accordance with the present invention, there is provided a tool and method for locating anomalies and the interface between two materials having little difference in their density in a well. More particularly, the method comprehends the generation of gamma rays and the detection of scattered rays at a point spaced from the point of generation of the gamma rays. By moving the points of generation and detection through the well, there will be observed a pronounced change in the detection rate of the scattered gamma rays when various interfaces and anomalies are traversed.

The focus interface tool includes a decentralizer, collar locator, electronics assembly, detector, and radiation generator, all enclosed in a non-magnetic stainless steel housing except for the electronics assembly whose housing is made of tubular steel. The radiation generator has a radioactive source which emits gamma rays, and the detector detects those rays reflected back to the detector. The detected rays are counted by electronic equipment at the surface and recorded on a log. The radioactive source is shielded within the tool by heavy metal (density greater than lead) to focus and concentrate the emission of gamma rays through restricted vertical and horizontal angles of radiation. The tool provides for the collimation of the original and the scattered gamma ray beams for better definition of the density changes.

In operation the tool is lowered to the bottom of the well on a cable having an electronic connection between the tool and the electronic equipment at the surface. The decentralizer locates the tool against the inner wall of the tubing and the radioactive source emits gamma rays through the tubing, any casing strings and into the well. The gamma rays impinge upon the molecules of the materials around the radioactive source and the number of rays reflected back to the detector are counted by the electronic equipment at the surface. The change in density of the various materials and anomalies around the inner tubing are determined by the change in the gamma ray count as the tool is traversed through the tubing in the boreholes.

BRIEF DESCRIPTION OF THE DRAWINGS

For a detailed description of preferred embodiments of the invention, reference will now be made to the accompanying drawings wherein:

FIG. 1 is an elevation view of a cross section of a salt mining well;

FIG. 2 is an elevation view of the focused nuclear interface survey instrument used in the well of FIG. 1;

FIGS. 3A, 3B, 3C, 3D, 3E, 3F, 3G and 3H are elevation views of the instrument of FIG. 2 shown substantially in section with FIGS. 3A, 3B and 3C showing the upper decentralizer, FIG. 3D showing the collar locator, FIG. 3E showing the electronics assembly, FIG. 3F showing the detector, FIG. 3G showing the lower decentralizer and FIG. 3H showing the radiation generator;

FIG. 5 is a section view of the detector shown in FIG. 3F, taken along line 5—5;

FIG. 6 is a section view of the radiation generator shown in FIG. 3H, taken along line 6—6;

FIG. 7 is a top view of the instrument shown in FIG. 2, taken along line 7—7;

FIG. 8 is an elevation view in schematic of a cross section of a salt mining well;

FIG. 9 is a typical log of the media and anomalies around the tubing in the borehole of the salt mining well of FIG. 8;

FIG. 10 is an elevation view in schematic of a cross section of a storage well; and FIG. 11 is a typical log of the media and anomalies around the tubing in the borehole of the storage well of FIG. 10.

BEST MODE FOR CARRYING OUT THE INVENTION

Figure 3H:
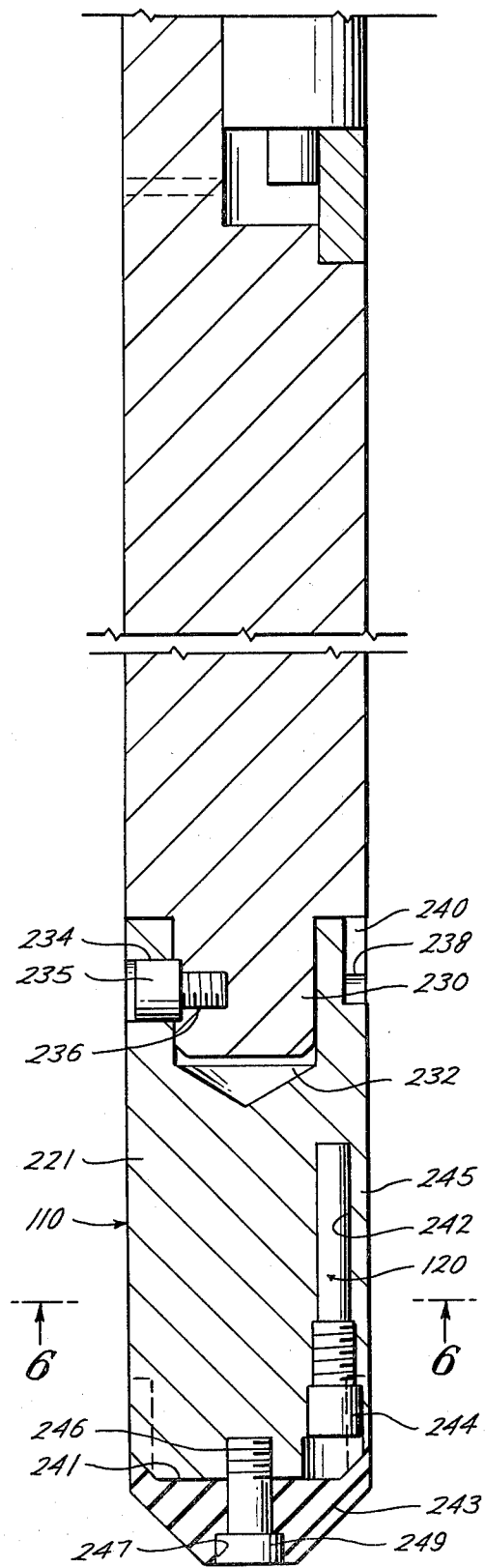

The instrument and method of the present invention may be used in a variety of applications but find particular utility where the media and anomalies to be logged have little difference in their densities, such as in mining and storage wells in a salt formation. Therefore, it should be understood that although the preferred embodiment described below is for salt mining wells, the present invention has other applications and should not be limited to the particular environment or application described.

Referring first to FIG. 1, there is shown a typical salt solution mining well where heavy casing and tubing are used and fluids having varied densities in the borehole and cavern are encountered. First the well is drilled through the surface formations 10 and the "cap" material 12 into the main plug 14 of the salt several hundred feet or deeper so that conductor casing 16 and seal casing 18 may be set and cemented as at 20 back to the surface. After cementing, the well is then drilled deeper through the casing to the desired depth. One or more strings of tubing 22, 24 are run into the well. The smaller pipe or fresh water tubing 22 is set deeper inside of the larger pipe or brine tubing 24 in the borehole 26. Hydrocarbons and/or inert gases are then pumped down the annulus 28 of seal casing 18 in the borehole 26 to the depth of the top of roof 32 of the cavern 30 to be mined. This "pad" 34 of hydrocarbons or gas prevents the fresh water from mining the salt forming the roof 32 and also controls the vertical and horizontal dimensions of the cavern 30 during mining operations.

In the mining operation fresh water at 36 is pumped into the well through the fresh water tubing 22. The water dissolves the salt formation and creates brine. The brine is then forced up the brine tubing 24 to the surface and the cavern 30 is formed in the salt formation 14. The nuclear focus interface survey instrument 50 is used to locate, among other things, the interface 40 between the pad and brine and the ends 42, 44 of the tubing strings 22, 24 respectively. If the well were to be shut down so that a water-brine interface were to form, instrument 50 could locate that interface in the well.

Referring now to FIGS. 1 and 2, the well logging instrument 50 of the present invention is suitable for continuous logging operations to obtain an accurate determination of density changes in the materials surrounding the tubing than heretofore have been possible. The instrument includes a fluid tight housing 52 adapted to be suspended in tubing 22 for traversing salt formation 14 and into cavern 30. Borehole 26 may be cased, as represented in FIG. 1, or uncased, and may be filled with a fluid or gas.

Suspension and vertical movement of the instrument 50 is controlled by an armored cable 54, which extends to the earth's surface and passes over a winch (not shown) provided with a commutating arrangement allowing electrical signals to be transmitted between the instrument 50 and surface equipment. The cable and winch are used to lower and raise the instrument 50 through the tubing 22 in a conventional manner. Information from the instrument 50 is transmitted to the surface via the cable 54 to conventional surface indicating means, such as a power supply, recorder, and rate meter. The recorder may be mechanically or electrically driven in a well known manner by a drive connection to a rotating measuring wheel that is mechanically driven by the cable so that the information from the instrument is recorded against a depth base as the instrument is passed along the tubing.

Referring again to FIG. 2, the nuclear focus interface survey instrument 50 includes upper decentralizer 60, collar locator 70, electronics assembly 80, detector 90, lower decentralizer 100, and radiation-generating section 110.

Referring now to FIGS. 3A, 3B, and 3C, upper decentralizer 60 includes a stainless steel housing 62 shown in FIG. 3B with a sub 112 shown in FIG. 3C mounted on its lower end to achieve proper alignment between decentralizer 60 and the other parts of tool 50. Sub 112 houses insulator 82 and brass contact 78 and includes enlarged bore 114 for receiving engaging pin 116. Pin 116 includes annular grooves 118 housing O-rings 120 for sealing engagement with the face of bore 114. To rotate and align upper decentralizer 60 with lower decentralizer 100 to insure that decentralizers 60,100 are properly aligned, a tapped hole 122 is provided in sub 112 and into bore 114 to engage a corresponding groove 124 in pin 116. Thus, sub 112 may be rotated on pin 116 to properly align decentralizers 60,100 and to align grooves 124 with pins 116 for maintaining such alignment.

Stainless steel non-magnetic housing 62 shown in FIG. 3A has a longitudinal bore 64 extending from the upper enlarged bore 66 at the upper end of decentralizer 60 to the lower enlarged bore 68 shown in FIG. 3C in sub 112. Electrical contact rod 72 passes through bore 64 for connection at its upper end shown in FIG. 3A to brass contact 74 mounted within insulator 76 which is housed within upper enlarged bore 66. the lower end of contact rod 72 is threadingly engaged to brass contact 78 mounted within insulator 82 which is housed within lower enlarged bore 68 shown in FIG. 3C of sub 112. Insulators 76, 82 shown in FIGS. 3A and 3C respectively have annular grooves for housing O-rings 84, 86 respectively for sealing engagement between insulators 76, 82 and the housing 62 shown in FIG. 3A and sub 112 shown in FIG. 3C. Brass contacts 74, 78 shown in FIGS. 3A and 3C respectively have annular grooves housing O-rings 88, 92 causing sealing engagement between insulator 76 and brass contact 74 shown in FIG. 3A, and insulator 82 and brass contact 78 shown in FIG. 3C respectively.

Suitable attachment means on the end of armored cable 54 shown in FIG. 2 is provided for threading engagement at 94 shown in FIG. 3A for connection to decentralizer 60. Contact screw 95 and threads 96, 98 shown in FIG. 3A and FIG. 3C respectively are provided in brass contacts 74, 78 respectively to complete electrical contact between cable 54 and rod 166 of collar locator 70 shown in FIG. 3D.

Referring again to FIG. 2, the instrument 50 is urged against the casing and tubing by a conventional eccentering means. Such means preferably include magnetic positioning devices or magnets 104, shown in FIG. 3B, but may include a bow spring or a spring-loaded hydraulic system. The use of magnetic positioning devices to hold a logging tool against the wall of a cased borehole is known and such devices generally include a magnet within an instrument housing.

Referring again to FIG. 3B, housing 62 includes a recess 102 for housing a plurality of magnets 104. Magnets 104 have a longitudinal bore 106 for receiving holding rod 108. Upon magnets 104 being mounted on rod 108 and inserted into recess 102, keeper plates 56, engageable with the extremities of rod 108, secure rod 108 and thus magnets 104 within recess 102.

When a magnetic positioning device is used to hold the instrument against the borehole casing, abrasion along a longitudinal strip of the housing may result, and it will be desirable to provide an abrasion resistant means on the strip to minimize the wear of the housing. Suitable protection may be provided by pads or by a protective coating applied to the instrument in a conventional manner.

Housing 62 preferably includes a plurality of recesses 128 shown in FIG. 3A and FIG. 3C for housing wear insert bodies 130. Wear insert bodies 130 are retained within recess 128 by retainer plate 132 suitably attached to housing 62 by screws 134. Wear insert bodies 130 are located in a plurality of locations along housing 62. Wear insert bodies 130, however, are not in axial alignment but are in staggered arrangement along the housing of instrument 50 as shown in FIG. 2. Such staggered alignment prevents tool 50 from rocking within tubing 22.

Referring now to FIG. 3C, sub 112 includes a threaded reduced diameter portion 140 for a threaded engagement with the threaded bore 142 in the top of collar locator 70. Reduced diameter portion 140 includes annular grooves for housing O-rings 144 permitting sealing engagement between sub 112 and the housing 57 of collar locator 70. A locking device 146 is provided on reduced diameter portion 140 to insure threaded engagement between sub 112 and collar locator 70. Locking device 146 may be of a friction fiber material.

It can be appreciated that sub 112 may be included as an integral part of housing 62. However, it is preferred to make sub 112 a separate part to provide an alignment means for decentralizers 60 and 100 as shown in FIG. 2.

Referring now to FIG. 3D, collar locator 70 includes stainless steel housing 57 having a longitudinal bore 150 passing into tandem sub 152 on the bottom of locator 70. Sub 152 includes an upper pin 156 threadingly engaging a bore 155 in housing 57 at 154. Pin 156 has annular grooves housing O-rings 159 for sealing engagement between pin 156 and bore 155.

Housed within housing 57 of collar locator 70, starting at its upper end, is magnet 158, coil assembly 160, magnet 162 and multi-conductor header 164. A conductor rod 166 passes through bore 150 to maintain electrical contact between brass contact 78 and one pin of multi-conductor header 164.

Sub 152 includes a round contact plunger 167 and spring 168 housed within bore 170 and screw 172 housed within tapped hole 174 for connection to a ground pin 176 in header 164. Multi-conductor header 164 is a modified eight pin socket. One of the pins is a signal lead which is connected to wire 175 extending to coil assembly 160.

Referring now to FIGS. 3E and 3F, electronics assembly 80 and detector 90 are mounted within housing 58 which is attached to sub 152 of collar locator 70. Sub 152 shown in FIG. 3D includes pin 178 inserted into threaded socket 180 of housing 58. Sub 152 and socket 180 are threadingly connected. Pin 178 includes a plurality of grooves housing O-rings 182, 184 for sealing engagement with socket 180. Housing 58 is made of a hydrostatic pressurized tubular steel.

Figure 4:
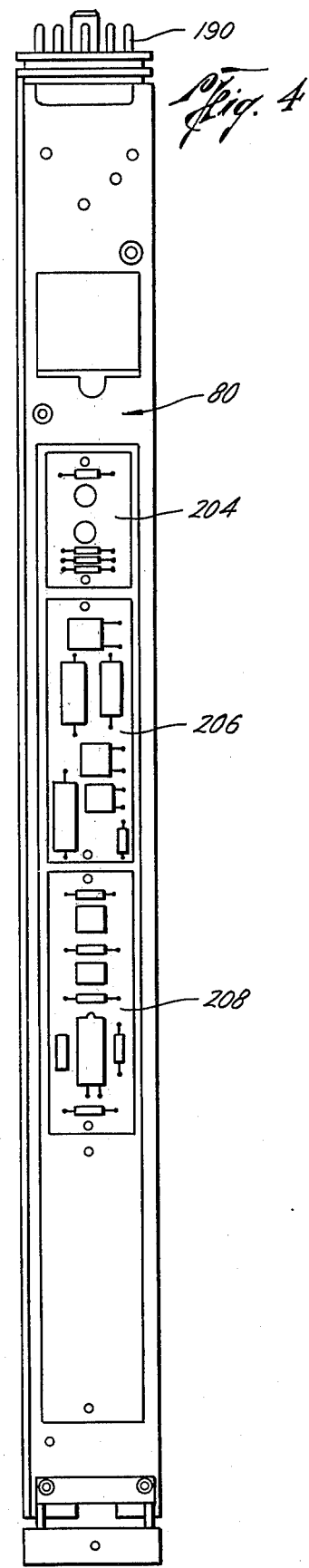
FIG. 4 is an elevation view of the other side of the electronics assembly shown in FIG. 3E.

Referring now to FIGS. 3E and 4, electronics assembly 80 includes a power supply, detector amplifier, collar locator amplifier and other filtering and transmission circuits. An eight pin header 190 shown in FIG. 4 is provided for electrical engagement with multi-conductor header 164 of collar locator 70 shown in FIG. 3D. Signal amplifiers are readily available and are well known to one skilled in the art. Such electronics will include a transformer 192, insulating board 194, electronic pre-amp board assembly 196, power distribution and CCL board assembly 198, an anti-coincidence board assembly 200, a pot trim 500K 202, all shown in FIG. 3E, and a high voltage oscillator board assembly 204, a high voltage doubler board assembly 206, and a gamma ray high voltage board assembly 208 shown in FIG. 4.

Referring now to FIGS. 3E, 3F and 5, detector 90 is mounted and housed in directional shield or collimator 210. Detector 90 is readily available in the trade and well known to one skilled in the art and can be of the scintillation type. Detector 90 is electrically engaged and connected at 201 with electronics assembly 80 shown in FIG. 3E. Detector 90 and directional shield or collimator 210 are mounted within housing 58 with electronics assembly 80. O-ring 203 in annular groove 205 in detector 90 provides sealing engagement between detector 90 and collimator 210. Collimator 210 shields detector 90 from undesirable radiation and directs the reception of the desired output radiation from the lower electron-acceleration and radiation-generating section 110 housing radioactive source 210 shown in FIG. 3H. Detector shield or collimator 210 includes a directional window 212 for directing the reception by detector 90 of the backscattered photons from the sample. Collimator 210 may be fabricated of any material appropriate to prevent unacceptable levels of photon radiation from reaching the detector 90 indirectly from radioactive source 120 shown in FIG. 3H. Such shields may be of any known gamma ray shielding materials such as lead, bismuth, mercury, tungsten alloy, or the like.

Referring now to FIGS. 3F, 3G and 3H, lower decentralizer 100 includes a pin 220 at its upper end insertable into socket 222 in collimator 210 of detector 90. Socket 222 includes two sets of holes 224, 226 for mating alignment with bores 225, 227 in pin 220 whereby the pins are received within holes 224, 226 and bores 225, 227 for attaching collimator 210 to lower decentralizer 100. Referring to FIG. 3G, decentralizer 100 includes magnets 104 housed similarly to magnets 104 in housing 62 shown in FIG. 3B, and includes wear pads 130 similarly housed as in housing 62 shown in FIG. 3A.

Electronics assembly 80 and detector 90 are connected together and mounted on lower decentralizer 100 at pin 220 and socket 222. These are inserted into housing 58, and lower decentralizer 100 is threaded at 231 onto the lower end of housing 58. O-rings 233 are housed in annular grooves 235 in lower decentralizer 100 for sealing engagement with housing 58.

Referring to FIG. 3H, decentralizer 100 includes a pin 230 for connection to directional shield or collimator 221 of radiation-generating section 110 which includes bore 232 for receiving pin 230. Source collimator 221 has three holes 234 for mating with tapped holes 236 in pin 230. Screws 235 are received through holes 234 and threaded into tapped holes 236 to secure decentralizer 100 to source collimator 221.

Referring to FIGS. 2 and 7, lower decentralizer 100 functions as a spacer and a shield between detector 90 and radiation-generating section 110. Decentralizer 100 separates detector 90 from radiation-generating section 110 by a predetermined distance. This predetermined distance locates the backscattering area or sample 260. The backscattering angle A is approximately 90 degrees so that the distance between the instrument 50 and the point of backscattering or sample 260 can be calculated from the distance between the detector 90 and radiation source 120. The distance between source 120 and detector 90 must locate sample 260 beyond tubing 22 and far enough away from the exterior of tubing 22 to provide an appropriate sample 260 when instrument 50 traverses tubing 24 and casings 16, 18.

Referring now to FIGS. 3H and 6, radiation-generating section 110 includes collimator 221 made of a high density tungsten alloy. Collimator 221 includes a longitudinal cavity 242 for receiving and housing radioactive source 120. A plug means 244 is provided to threadingly engage collimator 221 at the entrance of cavity 242 to contain radioactive source 120. A tapped hole 246 is provided in the end of collimator 221 to secure either a protective guide nose 243 or a handling tool (not shown) to collimator 221. Protective guide nose 243 includes a concave end 241 for receiving the lower end of collimator 221 and a bore 247 for receiving bolt 249 which threadingly engages hole 246. Nose 243 is removed to attach the handling tool for transporting collimator 221 and radioactive source 120. The tip of collimator 221 has a hexagonal cross section for engagement with the handling tool to facilitate the handling of source 120.

Cavity 242 is aligned with detector 90 and is located near the periphery of collimator 221. The passageway or window 245 is a thin strip of shielding material of collimator 221, preferably 0.125 inches, thick, located between source 120 and the exterior of instrument 50. The radiation becomes directed towards window 245 since it is the path of least resistance to the emission of gamma rays from source 120. FIG. 2 illustrates angle B, the vertical angle of radiation, which is the angle measured from the exterior of instrument 50 above source 120 to gamma ray beams 250 with maximum intensity. It may be preferred to create apertures through window 245 at the preferred vertical angle of radiation to further lessen the resistance of gamma ray emissions in that preferred direction toward the impact area or sample 260. Window 245 also directs the radiation through a horizontal angle of radiation, shown as angle C in FIG. 7. The horizontal angle of radiation is the angle measured from the gamma ray beams 250A with maximum intensity to the last gamma ray beams 250B with maximum intensity as illustrated in FIG. 7. Little practical radiation will be emitted at a horizontal angle of radiation greater than 180°. Maximum intensity is defined as any radiation having an intensity of 90% or more of those gamma ray beams having the highest radiation intensity. The vertical and horizontal angles of radiation define a radiation pattern having the form of a truncated polyhedron with a rectangular base. The vertical angle of radiation is in the range of 30° to 60°, preferably 45°, and the horizontal angle of radiation is in the range of 10° to 180°, preferably 60°. Without the shielding of collimator 221, radiation from source 120 would travel directly to detector 90, destroying the reliability and accuracy of the density count from the backscattering sample 260. Further, without restricted vertical and horizontal angles of radiation, the beam of rays will have less intensity and will lack definition and resolution as they travel toward sample 260.

A number of gamma radiation sources are known that are suitable for use with the apparatus of the present invention, such as, for example, a cobalt 60 (Co60), a cesium 137 ($C_s$137), or $Hg^{203}$ chemical source. When considering a particular source, it is important to balance the need for a high detection count rate giving results that are statistically reliable with the requirement that the source selected have as monoenergetic spectrum of emitted gamma radiation as obtainable so that the detected peak of singly scattered gamma radiation will have the best resolution possible.

In assembling instrument 50 it is important that magnets 104, the wear path of pads 130, detector 90 and source 120 all be in proper alignment. Initially, upper decentralizer is assembled by threading contract rod 72 onto brass contacts 74, 78, thereby mounting housing 62 with sub 112. Housing 57 of collar locator 70 is connected to sub 112 and contact rod 73 with multi-conductor header 164 threaded into brass contact 78. Detector 90 is then mounted onto electronics assembly 80 and lower decentralizer 100 is pinned by pins 227 to the bottom of detector 90. This assembly is inserted into housing 58 of electronics assembly 80 and connected to multi-conductor header 164. Contact rods 72,73, brass contacts 74, 78, head 164, electronics assembly 80, detector 90 and lower decentralizer 100 are all rotated for threading decentralizer 100 to the lower end of housing 58 of electronics assembly 80. Such assembly assures that detector 90 and radiation source 120 are properly aligned to emit and receive the photons through windows 245 and 212 respectively.

Referring again to FIG. 2 and also to FIG. 7, collimator 221 and window 245 direct the emission of gamma radiation to a well-defined beam 250 and collimator 210 and window 212 receive the detected gamma radiation from well-defined paths 252. By directing the monoenergetic gamma rays into the formation, the gamma rays leaving radiation source 120 are substantially restricted to the space between beams 250. The backscattered gamma rays are similarly collimated into detector 90 by collimator 210 and detector window 212 as shown by paths 252. There is ultimately defined area or sample 260, whose intensity is measured in the logging process. Of course other undesirable gamma rays 254, shown in FIG. 2, are emitted into the formation, which will not be backscattered toward and/or received by detector 90.

For a single scattering interaction to be detected by the detector arrangement, a gamma ray emitted through collimator 221 and window 245 by radiation source 120 will pass within the beam 250 of the emitted gamma radiation and, upon reaching the target or sample 260, will be scattered at, for example, location 262 at an angle A and be received through collimator 210 and passageway 212 to detector 90. As is well known, the energy of the gamma ray that would be detected after undergoing such a single scattering interaction can be calculated according to the following relationship if the energy of the emitted gamma radiation and the angle A are known:

$$E' = \frac{E}{1 + E/.511 (1 - \cos A)}$$

where E is the energy in MeV of the incident radiation and E' is the energy of the scattered radiation, also in a MeV. Similarly, within the target 260 the single scattering interaction may approach certain lines as limits and still be detected by the detector 90. Within the range of angular limitations defined by beams 250 and paths 252 is established a range of single scattering angles theta which by reference to the equation may be translated into a range of energy values for the detected singly scattered gamma rays given an emitted gamma ray of a particular energy. In accordance with the present invention, that range of energy values for the detected gamma radiation should be of the same order of magnitude or less than the energy resolution capability of the detector 90.

The present invention, to the greatest extent possible, tightly collimates the emission and the detection of singly scattered gamma radiation to improve such detection relative to multiple scattered gamma radiation. Tight collimation for purposes of the present application may be defined as the specific angular divergence of certain lines that will result in the detection of a range of singly scattered gamma rays that is of the same order of magnitude or less than the energy resolution capability of the detector 90 at the energy of the singly scattered gamma ray. Collimation also improves the definition of the depth of investigation of the detector 90.

The detector 90 and radiation source 120 should be positioned in a common reference plane which preferably contains the axis of the instrument. The decentralizers 60, 100 should also be positioned in that same referenced plane. If these are not aligned, the sensitivity of the detection will diminish since the backscattered radiation would have to penetrate the shield of collimator 210 to be received by detector 90.

In its preferred form, the gamma radiation source 120 and detector 90 are positioned at a predetermined vertical distance apart, with the radiation shielding means interposed therebetween. This vertical distance locates sample 260 at a desirable position in the formation.

In operation, instrument 50 is lowered to the bottom of the well on cable 54, providing an electronic connection between instrument 50 and the electronic equipment at the surface. The decentralizers 60, 100 locate the instrument 50 against the inner wall of the tubing as shown in FIGS. 1 and 2 and the radioactive source 120 continuously emits gamma rays 250 through window 245 of collimator 221 which directs the gamma rays 250 through the tubing 22 and into the well 30. The gamma rays 250 impinge upon the molecules of the sample 260 of the media around the tubing 22 and a number of gamma rays 252 are reflected back through window 212 of collimator 210 to the detector 90, which are then counted by the electronic equipment at the surface. The instrument 50 traverses the borehole by cable 54 at various speeds, whereby the density changes of the various media around the tubing 22 are determined by recording the change in the gamma ray count.

The detector 90 produces a signal representative of the energy of a detected gamma ray that is amplified in preamps and controlled by linear gates and gate control circuitry in order to coordinate its detection period with the emission of the gamma radiation beam. After being passed by the gates, pulses from the detector are applied to energy analyzers, each of which measures the peak amplitude of each incoming pulse and outputs a digital number representative thereof. The digital outputs from the energy analyzers are applied to telemetering circuits and are thereafter transmitted in a multiplexed fashion through armored cable 54 to the surface.

The discriminator is suitably adjusted to accept only those electrical pulses whose values correspond to a narrow range of gamma ray energies. This range of energies corresponds to the desired range of scattering angles for the monoenergetic gamma rays originating at the source and scattered at the critical scattering sample 260. The rate of emission of gamma rays from the radiation source 120 is constant, but the rate of detection of gamma rays in the specified energy band is determined not only by the geometry of the instrument 50 and the setting of the energy analyzer, but also by the absorption of gamma rays by the media and anomalies around the tubing 22.

As explained in detail previously, this absorption has a direct relationship to the density of the media through which the gamma rays have traveled. Thus the rate of arrival of these selected electrical pulses, corresponding to gamma rays of the proper energy value, is a measure of density of that portion of the media traversed by the gamma rays. At the earth'surface, the signals from the energy analyzers are amplified, decoded, and otherwise processed as needed in signal processing and transmitted to a density computer, which processes information from the detector to obtain density. The counting rate is indicated by recording means, such as an analog device using an oscilloscope, strip chart recorder, or digital printout.

Logging instrument 50 of FIG. 2 may also include means for classifying the detected gamma radiation according to energy ranges, means for storing the classified signals according to energy range and depth, and means for transmitting the classified signals to the surface. At the surface, in accordance with the system of the present invention, there is provided means for computing from the signals in each energy range and at each depth a media characteristic. Recording means will be included so that the characteristic is recorded correlative with the depth of the logging instrument from the surface of the earth as it traverses the tubing in the borehole.

FIG. 9 illustrates the recording or log 270 of the media and anomalies of the typical salt mining well of FIG. 8. The amplitude of log 270 increases from left to right whereby as the gamma ray count increases, the amplitude of log 270 will increase to the right. Thus the greater the amplitude, the less the density of the media and anomalies around the instrument 50. An abrupt change in amplitude indicates the location of a change in media or an anomaly.

Referring now to FIGS. 8 and 9, as instrument 50 is raised in tubing 272, the leg at 274' records tubing end 274. As instrument 50 travels up tubing 272, the collar locator will record horizontal marks on long 270 at 276 to provide a depth indicator. When the instrument 50 reaches the end 278 of tubing string 280, the amplitude of log 270 will decrease at 278' indicating the increased density. The interface 282 between pad 284 and brine 286 will show an increase in density at 282' due to the greater density of the pad 284 compared to the brine 286. The amplitude will drop at 292' as the instrument 50 passes the end 292 of seal casing 296 and will drop further at 294' as it passes the end 294 of heavy casing 298.

FIG. 11 shows the log 300 of the media and anomalies of a typical storage well illustrated in FIG. 10. Again, the depth is recorded at 302 by the collar locator. As the instrument is lowered into the well, the amplitude increases at 304' due to the decreased density as the instrument passes casing end 304. As the instrument passes the irregular borehole at 306 towards the roof of the cavern, the log at 306' shows the decrease in density. The interface 308 of the product 310 and brine 316 is shown at 308' on log 300, indicating the increase in density. The safety and brine tubing ends 312, 314 are noted at 312' and 314' on log 300 due to the decreased density.

From the foregoing description, it is believed that the method of invention and apparatus for carrying out the invention will be understood. While preferred embodiments of the invention have been shown and described, many modifications thereof can be made by one skilled in the art without departing from the spirit of the invention. For example, although the detector 90 and radiation source 120 have been illustrated as being positioned in the lower portion of instrument 50 and the electronics assembly 80 positioned in the upper portion of the instrument, it will be understood that the respective positions of the said elements can be reversed or arranged in any other suitable manner.

I claim:

1. An instrument for determining a fluid interface in an underground well, comprising:
    a housing;
    radiation means for emitting radiation into the well;
    a radiation collimator concentrically disposed on the lower end of said housing, said radiation means being eccentrically housed within said radiation collimator adjacent to the periphery thereof for directing the emission of radiation by said radiation means through restricted vertical and horizontal angles of radiation;
    detection means for detecting any backscattered radiation from the fluid;
    a cylindrical detection collimator mounted within said housing and having said detection means housed therein, said detection collimator having a window therein for exposing said detection means to the backscattered radiation, said window having an equi-radii cylindric surface area of exposure;
    means for establishing the area of backscattering from the fluid; and
    recording means for measuring the backscattered radiation.

2. An instrument according to claim 1 further including eccentering means for biasing said instrument against the tubing wall of the well.

3. An instrument according to claim 2 wherein said eccentering means includes magnets mounted to said instrument.

4. An instrument according to claim 1 further including means for preventing wear on said instrument as it traverses the well.

5. An instrument according to claim 1 wherein said radiation means, radiation collimator, detection means, and detection collimator are all in a common reference plane including the axis of the instrument.

6. An instrument according to claim 1 further including decentralizers and wear pads aligned with said radiation means and detection means.

7. An instrument according to claim 1 further including a collar locator.

8. An instrument according to claim 1 further including an electronics assembly for amplifying a signal from said detection means for measuring the backscattered radiation.

9. An instrument according to claim 1 wherein said means for establishing the backscattering includes means for separating said radiation means and detection means a predetermined distance apart.

10. An instrument according to claim 1 further including means for aligning said radiation means and detection means.

11. An instrument for determining a fluid interface in an underground well comprising:
    an upper decentralizer adapted for connection to a cable and having a bore for receiving a contact rod adapted for electrical connection to the cable;
    upper wear pads mounted on the exterior of said upper decentralizer;
    upper eccentering means on the upper decentralizer for eccentering the instrument within the well;
    an alignment sub connected to the lower end of said upper decentralizer and having a bore for receiving said contact rod;
    a collar locator mounted on said alignment sub and having a bore for receiving said contact rod;
    a common housing disposed on the lower end of said collar locator;
    an electronics assembly connected to said contact rod;
    a detector mounted onto said electronics assembly for detecting backscattered radiation;
    a detector collimator housing said detector and having a directional window for exposing a restricted cylindric surface area of said detector to backscattered radiation;
    said electronics assembly, detector collimator and detector mounted within said common housing;
    a lower decentralizer attached to said common housing;
    lower wear pads mounted on the exterior of said lower decentralizer;
    lower eccentering means on said lower decentralizer for eccentering the instrument within the well;
    a radiation collimator disposed on the lower end of said lower decentralizer and having an elongated cavity adjacent to its periphery; and
    a radiation source for generating radiation into the well housed within said cavity of said radiation collimator, said radiation collimator directing the emission of radiation through restricted vertical and horizontal angles of radiation.

12. The instrument of claim 11 and further including;
    means for aligning said upper and lower wear pads, said upper and lower eccentering means, said directional window and said cavity; and
    said lower decentralizer shielding said detector from radiation generated directly from said radiation source.

13. An instrument for determining a fluid interface in an underground well, comprising:
    a housing;
    a radiation source for emitting gamma rays into the well;
    a radiation shield made of a high density tungsten alloy concentrically disposed on the lower end of said housing, said shield having a cavity for receiving said radiation source, said cavity being eccentrically located within said shield, that portion of said shield forming said cavity and most adjacent to the periphery of said shield forming a thin strip of high density tungsten alloy having a thickness of approximately one-eighth inch whereby said gamma rays are directed towards said thin strip as the path of least resistance to emit said gamma rays through restricted vertical and horizontal angles of radiation;

a detector for detecting backscattered radiation from the fluid interface;

a detection collimator mounted within said housing and housing said detector, said detection collimator having an elongated window therein for exposing said detector to backscattered radiation;

means for establishing the area of backscattering from the fluid interface; and recording means for measuring the backscattered radiation from said area of backscattering.

14. An instrument for determining a fluid interface in an underground well, comprising:

an upper decentralizer including a stainless steel upper housing and a sub;

first alignment means on said upper decentralizer including an upper counterbore in said sub for receiving a reduced diameter portion on the lower end of said upper housing, said reduced diameter portion and sub having mating recesses for receiving an alignment screw;

sealing means for sealing between said reduced diameter portion and said sub;

electrical contact means on said upper decentralizer including a first contact rod extending through a coaxial longitudinal bore in said upper housing and sub, said coaxial longitudinal bore terminating at an upper counterbore in said upper housing and at a lower counterbore in said sub, a first insulator with a first brass contact mounted therein disposed in said upper counterbore of said upper housing and a second insulator with a second brass contact mounted therein disposed in said lower counterbore of said sub, one end of said first contact rod connected to said first brass contact and the other end of said first contact rod connected to said second brass contact;

sealing means for sealing between said upper housing and said first insulator and between said sub and said second insulator;

upper eccentering means on said upper decentralizer including an upper magnet having a bore therethrough for receiving an upper holding rod, a recess in said upper housing for receiving said upper magnet and holding rod, and upper keeper plates engageable with the ends of said upper holding rod for securing said upper holding rod in said recess;

upper wear means on said upper decentralizer including wear insert bodies, a plurality of apertures in said upper housing for receiving said wear insert bodies, and retainer plates for securing said wear insert bodies in said apertures, said wear insert bodies being in staggered arrangement on said upper decentralizer to prevent rocking within the well;

a collar locator including a stainless steel locator housing and a tandem sub, said locator housing being threadingly engaged to said upper decentralizer sub;

sealing means for sealing between said upper decentralizer sub and said locator housing and for sealing between said locator housing and said tandem sub;

collar locator means disposed in said locator housing for locating casing collars within the well including a first magnet, a coil assembly, a second magnet, and a multiconductor header;

second electrical contact means on said collar locator including a lower contact rod extending through a coaxial longitudinal bore in said locator housing and tandem sub, the upper end of said lower contact rod connected to said second brass contact and the lower end of said lower contact rod connected to said multi-conductor header disposed in a lower counterbore in said tandem sub, said coil assembly being electrically connected to said multi-conductor header, said multi-conductor header and coil assembly being grounded;

a common housing made of hydrostatic pressurized tubular steel threadedly connected to said tandem sub;

seal means for sealing between said common housing and tandem sub;

an electronics assembly including a power supply, detector amplifier, collar locator amplifier and filtering and transmission circuits;

a detector for detecting backscattered radiation, said electronics assembly mounted on and connected to said detector;

a detector collimator for receiving said detector, said detector collimator being made of a gamma ray shielding material and having a directional window therein for exposing a restricted cylindric surface area of said detector to backscattered radiation;

seal means for sealing between said detector and detector collimator;

said electronics assembly, detector, and detector collimator being housed in said common housing; said electronics assembly electrically engaging said multi-conductor header;

a lower decentralizer including a stainless steel lower housing having a pin inserted into said common housing and said detector collimator;

seal means for sealing between said pin and said common housing;

second alignment means on said lower decentralizer including mating holes in said pin and detector collimator for receiving alignment screws;

lower eccentering means on said lower decentralizer including a lower magnet having a bore breakthrough for receiving a lower holding rod, a recess in said lower housing for receiving said lower magnet and holding rod, and lower keeper plates engageable with the ends of said lower holding rod for securing said lower holding rod in said recess;

lower wear means on said lower decentralizer including wear insert bodies, a plurality of apertures in said lower housing for receiving said wear insert bodies, and retainer plates for securing said wear insert bodies in said apertures, said wear insert bodies being in staggered arrangement on said lower decentralizer to prevent rocking within the well;

a radiation collimator having an upper counterbore for receiving a projection from the lower end of said lower decentralizer;

third alignment means including mating holes in said projection and radiation collimator and an alignment screw received by said holes;

said radiation collimator having an elongated cavity eccentrically disposed within said radiation collimator adjacent to its periphery for directing the emission of radiation through restricted vertical and horizontal angles of radiation;

a radiation source disposed in said cavity for generating radiation into the well, said radiation collimator having a plug to close said cavity;

a protective guide nose affixed to the lower end of said radiation collimator and having means for facilitating the handling of said radiation source;

said lower decentralizer acting as a radiation shield between said radiation source and detector and having a predetermined length for spacing said radiation source a predetermined distance from said detector whereby the point of backscattering will pass through the fluid interface; and said first, second, and third alignment means causing said upper and lower eccentering means, upper and lower wear means, directional window and cavity to be in alignment.

15. An instrument according to claims 1, 11, 13 or 14 wherein said radiation collimator starts the emission of radiation at maximum intensity at a vertical angle of radiation between 30° and 60°.

16. An instrument according to claims 1, 11, 13 or 14 wherein said radiation collimator begins the emission of maximum radiation at a vertical angle of radiation of forty-five degrees.

17. An instrument according to claims 1, 11, 13 or 14 wherein said radiation collimator limits the emission of radiation at a maximum intensity through a horizontal angle of radiation between 10° and 180°.

18. An instrument according to claims 1, 11, 13 or 14 wherein said radiation collimator restricts the emission of maximum radiation through a horizontal angle of radiation of sixty degrees.

19. In a storage well formed in a water-soluble salt dome in the earth in which brine solution is present with the stored product filling the well and forming with the stored product an interface and in which tubing extends from the surface of the earth toward the bottom of the well for the addition of and the removal of brine solution and product, the method of determining the position of the interface comprising the steps of:

moving a source of gamma rays through the tubing and along a path substantially traversing the depth of the storage well;

radiating gamma rays from a radiation source eccentrically housed within a radiation collimator and adjacent to the periphery of the radiation collimator;

directing the gamma rays through a thin wall of the radiation collimator;

collimating the emission of gamma rays through restricted vertical and horizontal angles of radiation;

directing gamma rays beyond the tubing into the stored product in the well and surrounding the tubing, at a point spaced a predetermined distance from the source and within the tubing;

collimating the reception of backscattered gamma rays backscattered by the stored product outside the tubing;

exposing an equi-radii cylindric surface area of a detector to the backscattered gamma rays;

detecting the backscattered gamma rays;

generating a signal representative of the number of backscattered gamma rays detected at said point; and recording the signal for indication of the interface.

20. In a mining well in a salt formation in the earth where fresh water is pumped into tubing suspended within casing cemented into the well to form a brine solution and in which a hydrocarbon pad is disposed in the well forming an interface with the brine solution, the method of determining the location of the brine-pad interface and all anomalies including that of the casing and tubing, comprising the steps of:

moving a source of gamma rays through the tubing and along a path substantially traversing the depth of the storage well;

radiating gamma rays from a radiation source eccentrically housed within a radiation collimator and adjacent to the periphery of the radiation collimator;

directing gamma rays through a thin wall of the radiation collimator;

collimating the emission of gamma rays through restricted vertical and horizontal angles of radiation;

directing gamma rays beyond the tubing into the brine solution, at a point spaced a predetermined distance from the source and within the tubing;

collimating the reception of backscattered gamma rays backscattered by the brine solution outside the tubing;

exposing an equi-radii cylindric surface area of a detector to the backscattered gamma rays;

detecting the backscattered gamma rays;

generating a signal representative of the number of backscattered gamma rays detected at said point; and recording the signal for indication of the interface and anomalies.

* * * * *

UNITED STATES PATENT AND TRADEMARK OFFICE
CERTIFICATE OF CORRECTION

PATENT NO. : 4,342,911
DATED : August 3, 1982
INVENTOR(S) : Lewis L. French

It is certified that error appears in the above—identified patent and that said Letters Patent is hereby corrected as shown below:

Column 8, line 34, "210" should read -- 120 --.

Signed and Sealed this

Twenty-sixth Day of October 1982

[SEAL]

Attest:

GERALD J. MOSSINGHOFF

*Attesting Officer*      *Commissioner of Patents and Trademarks*